Dec. 16, 1952  B. E. RICKS  2,621,950
SWIVEL JOINT
Filed Oct. 24, 1947
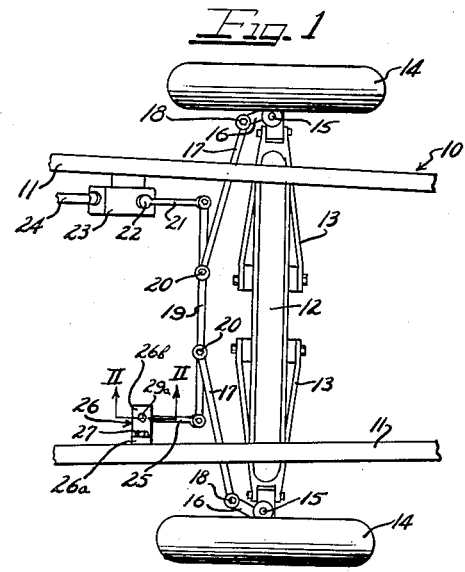
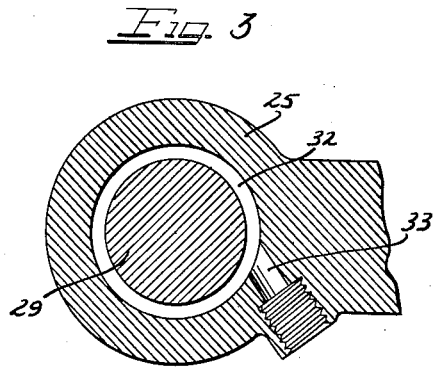
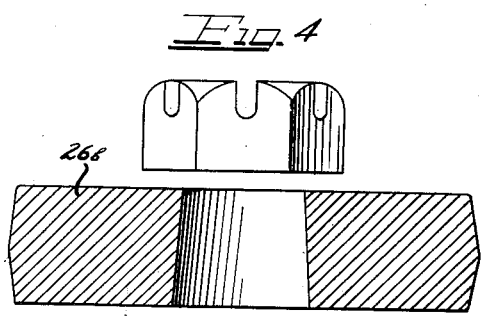
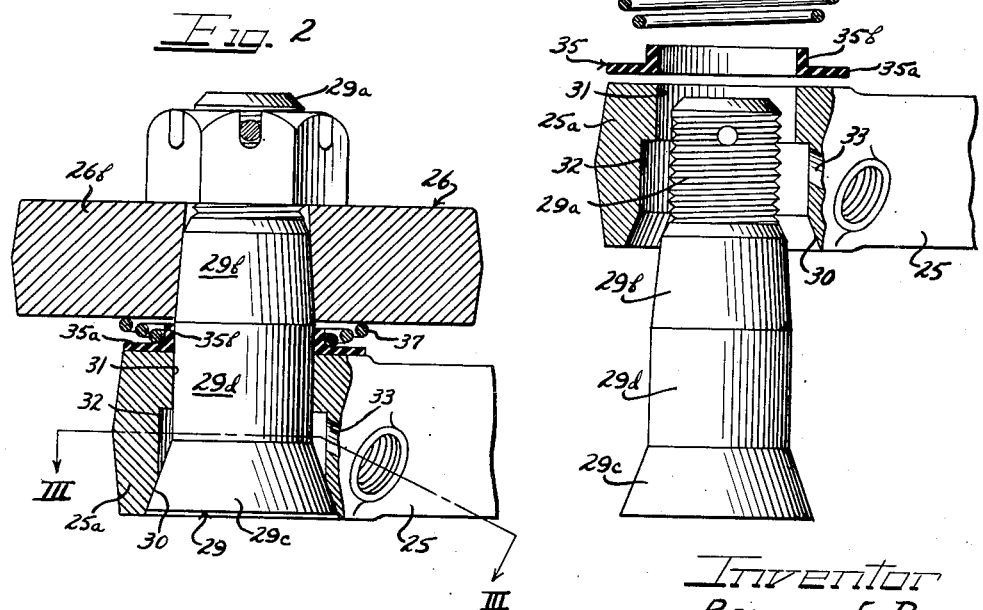
Inventor
BERNARD E. RICKS
The Firm of Charles W. Hills
Attys.

Patented Dec. 16, 1952

2,621,950

UNITED STATES PATENT OFFICE 2,621,950

SWIVEL JOINT

Bernard Elijah Ricks, Ferndale, Mich., assignor to Thompson Products, Inc., Cleveland, Ohio, a corporation of Ohio Application October 24, 1947, Serial No. 781,983

4 Claims. (Cl. 287—96)

1

This invention relates to a joint construction. Specifically, this invention deals with a swivel joint assembly adapted to be suspended from a support member on the frame of an automobile for holding the outer end of an idler arm for free pivoting relative to the support member.

While the invention hereinafter will be specifically described as embodied in an idler arm swivel joint assembly, it should be understood that the principles of the invention are generally applicable to swivel joints and the invention is, therefore, not limited to the disclosed preferred usage.

According to this invention, a bracket is mounted on a side frame beam of an automobile chassis to provide a mounting ledge. The ledge is apertured and receives the threaded end of a stud therethrough. A nut is tightened on the threaded end of the stud to clamp the stud to the bracket.

At one end, the stud has a frusto-conical head portion adapted to receive the eye end of an idler arm therearound, said frusto-conical head portion engaging a mating surface of the eye portion in bearing relation. A portion of the mating frusto-conical surface of the eye portion is cut away or relieved to form an annular grease reservoir around the stud and a hole for a grease fitting is tapped in the wall of the eye member communicating with the grease reservoir.

A dust washer, fitted close around the stud between the eye portion of the idler arm and the support member, acts as a bearing member for a spring which encircles the stud between the washer and the support member, urging the frusto-conical surface of the stud into bearing engagement with the mating surface in the eye of the idler arm to automatically compensate for wear between these members.

A straight cylindrical shank portion of the stud engages in bearing relation a cylindrical bore in the eye of the idler arm to furnish a secondary bearing surface.

Thus, there is provided in this invention, a stud secured in a support member and adapted to receive the eye portion of an idler arm for pivoting on both a straight cylindrical bearing surface and on a conical surface, lubricant being supplied to both pairs of bearing surfaces from a ring-shaped reservoir disposed around the shank of the stud between the bearing areas.

Accordingly, it is an object of this invention to provide a joint assembly which employs a plurality of bearing surfaces between the stud and the housing.

2

Another object of this invention is to provide a swivel joint for an idler arm or the like wherein bearing surfaces of the joint are maintained in constant engagement by a spring which is interposed between the arm portion of the joint and a mounting support member for the arm.

A further object of this invention is to provide a swivel joint construction for an idler arm or the like wherein a frusto-conical surface on the stud of the joint accurately centers the idler arm for swinging movement about a support member.

A specific object of this invention is to provide a swivel joint in which a stud is journaled for rotation in a housing on a tapered bearing surface and guided in a secondary cylindrical bearing surface with an oil reservoir disposed between said bearing areas.

Other and further objects of this invention will be apparent to those skilled in the art from the following detailed description of the annexed sheet of drawing, which, by way of a preferred example only, illustrate one embodiment of the invention:

On the drawing:

Figure 1 is a fragmentary top plan view of an automobile chassis having a parallelogram type steering linkage equipped with an idler arm according to this invention.

Figure 2 is an enlarged vertical cross-sectional view taken along the line II—II of Figure 1.

Figure 3 is a horizontal sectional view taken substantially on line III—III of Figure 2.

Figure 4 is a vertical cross-sectional view, similar to Figure 2, but illustrating the parts in a separated or exploded relation.

As shown on the drawing:

In Figure 1, the reference numeral 10 designates generally an automobile chassis having side beams 11—11 and a transverse beam 12. Wheel control arms 13—13 are pivoted on the transverse beam 12 and support the front wheels 14—14 of the automobile. These wheels are rotated on spindles, (not shown), pivoted on kingpins 15—15. A pair of steering arms 16—16 extend rearwardly from the spindle assembly and are connected to tie rods 17—17 through ball and socket type joints 18—18. The tie rods 17—17 extend inwardly to the cross-link 19 of a parallelogram type steering linkage, and are connected thereto by means of ball and socket type joints 20—20. One end of the cross-link 19 is pivoted to a pitman arm 21 suspended on the rock shaft 22 of a steering column gear box 23 carried on one of the side frame beams 11. The steering column 24 rotates the rock shaft 22 to swing the pitman arm and thereby longitudinally shift the cross-link for swinging the wheels 14 about the kingpins 15, thereby steering the automobile.

The other end of the cross-link 19 is connected to an idler arm 25. This idler arm must be, and is, according to this invention, accurately mounted for swiveling around a fixed center. The swivel mounting is provided according to this invention by an angle type bracket 26 which has a substantially vertical arm 26a secured by means of a bolt 27 to the inner face of the chassis beam 11, opposite the beam carrying the bear box 23. The other arm 26b of the angle bracket extends substantially horizontally to receive in an aperture near its outer end the threaded end 29a of a stud 29.

For securing the stud 29 to the support bracket arm 26b, the stud is provided with a tapered portion 29b, Figure 2, directly below the threaded end 29a. The stud may thus be tightly drawn into a mating tapered aperture in the support bracket 26. It is to be understood that the stud could be attached to the support bracket by any standard method, such as by riveting. A second tapered, or frusto-conical surface 29c is provided at the opposite end of the stud, with a straight cylindrical shank portion 29d between the tapered portions.

The idler arm 25 has an eye end portion 25a with a bore providing a frusto-conical bearing portion 30 at one end and a straight cylindrical bearing portion 31 at the opposite end. A relieved portion 32, of a diameter larger than the bearing portion 31, is provided between the two bearing portions of the eye end 25a.

As seen in Figure 2, when assembled, the frusto-conical portion 29c of the stud is disposed in bearing relation on the bearing portion 30 of the idler arm, while the cylindrical shank 29d of the stud is in close bearing contact with the cylindrical bearing portion 31 of the idler arm. The zone around the stud provided by the relieved portion 32 of the idler arm furnishes a convenient lubricant reservoir. A passage 33 in the eye end of the idler arm 25 has communication at one end with this reservoir and is tapped at its other end to receive a grease fitting for directing lubricant to the reservoir.

To prevent dirt and dust from entering the joint, a washer 35 is disposed about the stud 29. This washer has a flat ring portion 35a which lies close on the top of the eye end portion of the idler arm and an upstanding sleeve ring portion 35b which closely hugs the stud 29. The washer 35 also acts as a bearing for the innermost coil of a spring 37, preferably of tapered configuration, which is disposed between the support member 26 and the washer. The joint is preferably assembled with the spring compressed so that it will in operation always exert a force tending to seat the frusto-conical portion 30 of the idler arm on the mating surface of the stud 29 and thus automatically compensate for wear on these surfaces.

From the foregoing description, it is seen that there is provided in this invention, a joint in which a stud 29 is journaled for rotation in the eye end 25a of an idler arm, the idler arm being disposed for free rotation on a tapered bearing surface and on a secondary cylindrical bearing surface. These bearing surfaces are on opposite sides of a grease reservoir provided in the eye. A spring urged seal automatically compensates for wear on the tapered bearing surfaces.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A swivel joint assembly adapted for the idler arm of a steering assembly which comprises a mounting bracket having an apertured mounting ledge, an arm having an eye end with a hole therethrough including a tapered portion at one end of the hole, a cylindrical portion at the other end and a relieved portion between the end portions, a stud depending from said ledge and having a tapered head in bearing engagement in said tapered hole of the eye end, said stud having a shank disposed in bearing relation with the cylindrical portion of the hole in said eye end, the relieved portion of the hole providing a lubricant reservoir around said stud and adjacent the bearing surfaces of the joint and a loaded spring surrounding the shank of the stud between the eye of the arm and the ledge of the bracket to urge the tapered head of the stud and the tapered hole of the eye with bearing relation thereby sealing the reservoir and taking up wear on the parts.

2. A swivel joint comprising a stud having a frusto-conical head on one end thereof, and a cylindrical shank portion extending from the small end of the head, a housing swivelly mounted on said stud having a frusto-conical surface in bearing contact with the stud head, a cylindrical surface in bearing contact with the cylindrical stud shank and a relieved portion between said two bearing surfaces forming a lubricant reservoir about said stud, said housing having a passage in communication at one end with the lubricant reservoir and tapped at the other end for receiving a grease fitting, means urging the stud head against the frusto-conical surface of the housing to yieldably hold the parts in bearing relation thereby sealing one side of the reservoir, and a sealing washer on the stud shank bottomed on the housing to seal the other side of the reservoir.

3. A swivel joint comprising a stud having a tapered head portion and a cylindrical shank portion, a housing having a hole therethrough including a tapered bearing portion and a cylindrical bearing portion with a lubricant reservoir therebetween, the tapered head of said stud being disposed in rotatable bearing relation on the tapered portion of the hole and the shank of the stud closely engaging the cylindrical portion of the hole for rotation therein and for sealing the reservoir on one side thereof, a bearing seal member having a portion closely engaged about the shank of said stud and a portion abutting said housing on the side opposite to said tapered bearing portion for sealing the reservoir on the other side thereof, and means thrusting against said bearing seal member for automatically urging said housing tapered bearing portion into bearing engagement with said stud tapered head portion.

4. A joint assembly comprising a housing having a bore therethrough, said bore having a cylindrical portion and a tapered portion diverging outwardly from said cylindrical portion and an intermediate portion between said tapered and cylindrical portions which comprises a second cylindrical portion of a larger diameter than the first cylindrical portion and which intersects the tapered portion to form an annular grease reservoir, a stud rotatably mounted in said housing, said stud having a cylindrical portion for cooperation with said first cylindrical portion of said housing and a tapered portion for cooperation with said tapered portion of said housing, means for supplying grease to said annular grease reservoir, resilient means for biasing the tapered surface of said stud into contact with the tapered surface of said housing and seal means between the cylindrical portion of said stud and the outside of said housing for preventing grease leakage.

BERNARD ELIJAH RICKS.

REFERENCES CITED

The following references are of record in the file of this patent:

UNITED STATES PATENTS

| Number | Name | Date |
|---|---|---|
| 148,369 | Jones | Mar. 10, 1874 |
| 537,491 | Smith | Apr. 16, 1895 |
| 1,055,398 | Horvath | Mar. 11, 1913 |
| 1,247,094 | Eibye et al. | Nov. 20, 1917 |
| 1,393,817 | Olson | Oct. 18, 1921 |
| 1,451,040 | Gulick | Apr. 10, 1923 |
| 1,838,799 | Welch | Dec. 29, 1931 |
| 1,856,325 | Flentje | May 3, 1932 |
| 1,910,926 | Lutz | May 23, 1933 |
| 1,985,781 | Hufferd et al. | Dec. 25, 1934 |
| 2,071,341 | Hufferd et al. | Feb. 23, 1937 |
| 2,099,209 | Hufferd | Nov. 16, 1937 |
| 2,517,231 | Paul | Aug. 1, 1950 |